US012725637B2

(12) United States Patent
Uphale et al.

(10) Patent No.: US 12,725,637 B2
(45) Date of Patent: Sep. 1, 2026

(54) DATA STORAGE DEVICE AND METHOD FOR REDUCING AN IMPACT OF A WORDLINE-TO-WORDLINE SHORT WHEN STORING VIDEO

(71) Applicant: Sandisk Technologies, Inc., Milpitas, CA (US)

(72) Inventors: Snehal Vithal Uphale, Bangalore (IN); Akshay Teeka Srinivas, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 110 days.

(21) Appl. No.: 18/661,993

(22) Filed: May 13, 2024

(65) Prior Publication Data

US 2025/0349322 A1 Nov. 13, 2025

(51) Int. Cl.
*G11B 27/34* (2006.01)
*G06F 11/10* (2006.01)

(52) U.S. Cl.
CPC .......... *G11B 27/34* (2013.01); *G06F 11/1096* (2013.01)

(58) Field of Classification Search
CPC ............................ G11B 27/34; G06F 11/1096
USPC .................. 386/239, 281; 709/231; 714/763; 360/53
See application file for complete search history.

(56) References Cited

U.S. PATENT DOCUMENTS 8,730,722 B2 5/2014 Koh et al.
8,780,635 B2 7/2014 Li et al.
9,092,325 B2 * 7/2015 Dumitru ............... G06F 3/0674
9,165,683 B2 10/2015 Tam
9,390,809 B1 7/2016 Shur et al.
10,014,060 B2 * 7/2018 Tuers ................. G11C 16/3427
10,841,645 B1 * 11/2020 Muthiah ............ H04N 21/4335
11,150,839 B2 * 10/2021 Muthiah ............... G06F 3/0619
11,221,950 B2 1/2022 Muthiah
2002/0035732 A1 * 3/2002 Zetts .................... H04N 21/242 375/E7.278
2003/0077066 A1 * 4/2003 Greenwood ......... G11B 27/329 386/281
2006/0098320 A1 * 5/2006 Koga .................. G06F 11/1004 360/53
2006/0143235 A1 * 6/2006 Takaku .................. G11B 27/34
2007/0041719 A1 * 2/2007 Takada ................... G11B 27/36 386/239
2009/0132721 A1 * 5/2009 Soroushian ............ G11B 27/30 709/231

(Continued)

*Primary Examiner* — Thai Q Tran
*Assistant Examiner* — Stephen R Smith
(74) *Attorney, Agent, or Firm* — Crowell & Moring LLP

(57) ABSTRACT

A data storage device and method are disclosed for reducing an impact of a wordline-to-wordline short when storing video. In one embodiment, a data storage device is provided comprising a memory comprising a plurality of worklines and one or more processors. The one or more processors, individually or in combination, are configured to: receive, from a host, a plurality of video frames for storage in the memory; receive, from the host, information regarding an order of the plurality of video frames; and store the plurality of video frames in the memory such that consecutive video frames are stored in non-consecutive wordlines as protection against a wordline-to-wordline short. Other embodiments are provided.

18 Claims, 8 Drawing Sheets

Frame storage mechanism in the flash blocks

(56) References Cited

U.S. PATENT DOCUMENTS

| | | | | |
|---|---|---|---|---|
| 2009/0257729 | A1* | 10/2009 | Ahn | H04N 21/2747 |
| | | | | 386/239 |
| 2016/0286192 | A1* | 9/2016 | Yoneda | H04N 21/4335 |
| 2019/0180789 | A1* | 6/2019 | Aiba | G11B 27/34 |
| 2021/0185228 | A1* | 6/2021 | Wada | G11B 27/34 |
| 2021/0191860 | A1* | 6/2021 | Muthiah | G11C 16/26 |
| 2022/0382809 | A1* | 12/2022 | Muthiah | G06F 16/71 |
| 2024/0298044 | A1* | 9/2024 | Muthiah | H04N 21/231 |
| 2024/0338275 | A1* | 10/2024 | Navon | G06F 11/1068 |

* cited by examiner

TO HOST
NON-VOLATILE STORAGE SYSTEM
100
CONTROLLER
102
104
NON-VOLATILE MEMORY

TO HOST
STORAGE MODULE
200
202
STORAGE CONTROLLER
204
102
CONTROLLER
100
104
NVM

HOST
252
HIERARCHICAL STORAGE SYSTEM
250
202
STORAGE CONTROLLER
204
STORAGE SYSTEM

Mechanism A: Packet structure

Header

Payload

Data type

Data length

Frame ID

Other fields

FIG. 6

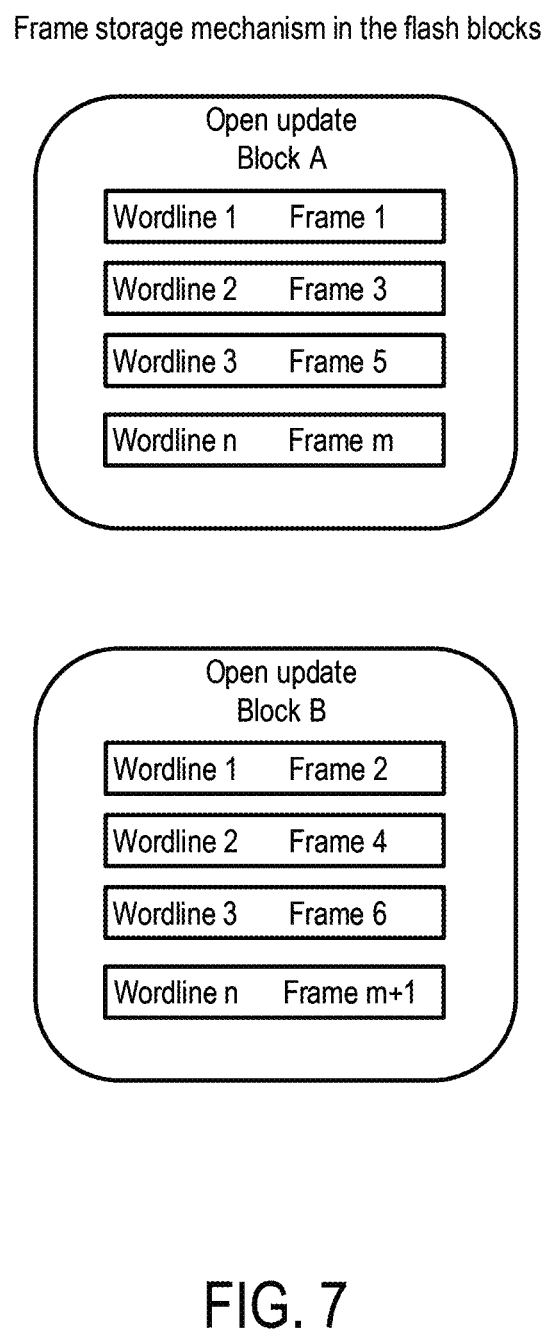

Frame storage mechanism in the flash blocks

Open update
Block A

Wordline 1 Frame 1
Wordline 2 Frame 3
Wordline 3 Frame 5
Wordline n Frame m

Open update
Block B

Wordline 1 Frame 2
Wordline 2 Frame 4
Wordline 3 Frame 6
Wordline n Frame m+1

FIG. 7

DATA STORAGE DEVICE AND METHOD FOR REDUCING AN IMPACT OF A WORDLINE-TO-WORDLINE SHORT WHEN STORING VIDEO

BACKGROUND

A memory of a data storage device can be susceptible to a wordline-to-wordline short, in which a damaged wordline can result in damage to an adjacent wordline. To handle wordline-to-wordline shorts, the data storage device can use various writing and error correction mechanisms. For example, the data storage device can use a dual write technique to write the same data to two blocks. That way, if there is an error writing the data in one block, the data can be recovered from the second block. As another example, an enhanced post-write read (EPWR) operation can be used to detect errors while writing an open block. If an error is detected, the write operation can be retried. As yet another example, an exclusive-or (XOR) operation can be used, in which multiple pages of data are XOR'ed together to generate XOR parity. If one of the pages gets corrupted, the XOR parity and other pages that have participated in parity generation can be used to recover the failed page.

BRIEF DESCRIPTION OF THE DRAWINGS

FIG. 6 is an illustration of a packet structure of an embodiment.

FIG. 7 is an illustration of open update blocks of an embodiment.

DETAILED DESCRIPTION

Figures 1A, 1B, 1C:
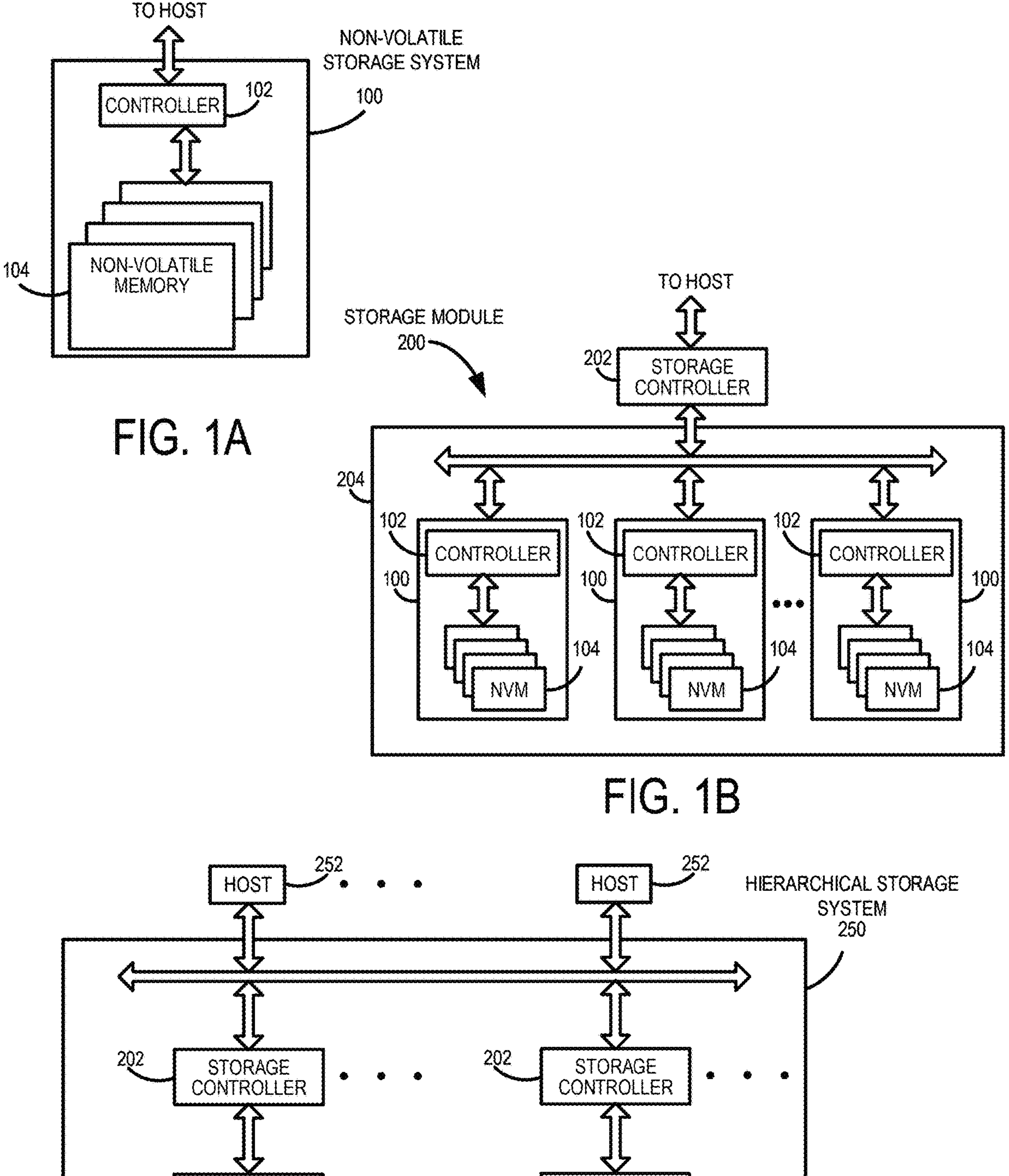
FIG. 1A is a block diagram of a data storage device of an embodiment.
FIG. 1B is a block diagram illustrating a storage module of an embodiment.
FIG. 1C is a block diagram illustrating a hierarchical storage system of an embodiment.

The following embodiments generally relate to a data storage device and method for reducing an impact of a wordline-to-wordline short when storing video. In one embodiment, a data storage device is provided comprising a memory comprising a plurality of worklines and one or more processors. The one or more processors, individually or in combination, are configured to: receive, from a host, a plurality of video frames for storage in the memory; receive, from the host, information regarding an order of the plurality of video frames; and store the plurality of video frames in the memory such that consecutive video frames are stored in non-consecutive wordlines as protection against a wordline-to-wordline short.

In some embodiments, the one or more processors, individually or in combination, are further configured to store consecutive video frames in different open blocks.

In some embodiments, the information regarding the order of the plurality of video frames comprises frame numbers.

In some embodiments, the host is configured to segregate the plurality of video frames from a video file and number the plurality of video frames incrementally with the frame numbers.

In some embodiments, the information regarding the order of the plurality of video frames is stored in headers of the plurality of video frames, wherein a header of given video frame of the plurality of video frames identifies that video frame's position in the order.

In some embodiments, the information regarding the order of the plurality of video frames is received as individual write commands.

In some embodiments, the plurality of video frames is stored the memory without using a dual write operation.

In some embodiments, the plurality of video frames is stored the memory without using an enhanced post-write read (EPWR) operation.

In some embodiments, the plurality of video frames is stored the memory without using an exclusive-or (XOR) operation to generate XOR parity.

In some embodiments, the memory comprises a three-dimensional memory.

In another embodiment, a method is provided that is performed in a data storage device in communication with a host, the data storage device comprising a memory comprising a plurality of wordlines. The method comprises: receiving, from the host, a plurality of video frames for storage in the memory; and storing adjacent video frames of plurality of video frames in non-adjacent wordlines in the memory.

In some embodiments, the adjacent video frames of plurality of video frames are stored in different open blocks.

In some embodiments, further comprising receiving, from the host, information for identifying which video frames of the plurality of video frames are adjacent.

In some embodiments, the information comprises frame numbers.

In some embodiments, further comprising negotiating a communication mechanism with the host for receiving the information for identifying which video frames of the plurality of video frames are adjacent.

In some embodiments, the communication mechanism is negotiated at after power on.

In some embodiments, the communication mechanism is negotiated during runtime.

In some embodiments, a protocol-specific mechanism is used to receive the information regarding the order of the plurality of video frames from the host.

In some embodiments, the protocol-specific mechanism comprises a stream identifier.

In yet another embodiment, a data storage device is provided comprising: a memory comprising a plurality of wordlines; and means for storing consecutive video frames in non-adjoining wordlines in the memory to avoid a wordline-to-wordline short corrupting both of the consecutive video frames.

Other embodiments are possible, and each of the embodiments can be used alone or together in combination. Accordingly, various embodiments will now be described with reference to the attached drawings.

EMBODIMENTS

The following embodiments relate to a data storage device (DSD). As used herein, a "data storage device" refers to a non-volatile device that stores data. Examples of DSDs include, but are not limited to, hard disk drives (HDDs), solid state drives (SSDs), tape drives, hybrid drives, etc. Details of example DSDs are provided below.

Examples of data storage devices suitable for use in implementing aspects of these embodiments are shown in FIGS. 1A-1C. It should be noted that these are merely examples and that other implementations can be used. FIG. 1A is a block diagram illustrating the data storage device 100 according to an embodiment. Referring to FIG. 1A, the data storage device 100 in this example includes a controller 102 coupled with a non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. The controller 102 interfaces with a host system and transmits command sequences for read, program, and erase operations to non-volatile memory die 104. Also, as used herein, the phrase "in communication with" or "coupled with" could mean directly in communication/coupled with or indirectly in communication/coupled with through one or more components, which may or may not be shown or described herein. The communication/coupling can be wired or wireless.

Figure 2A:
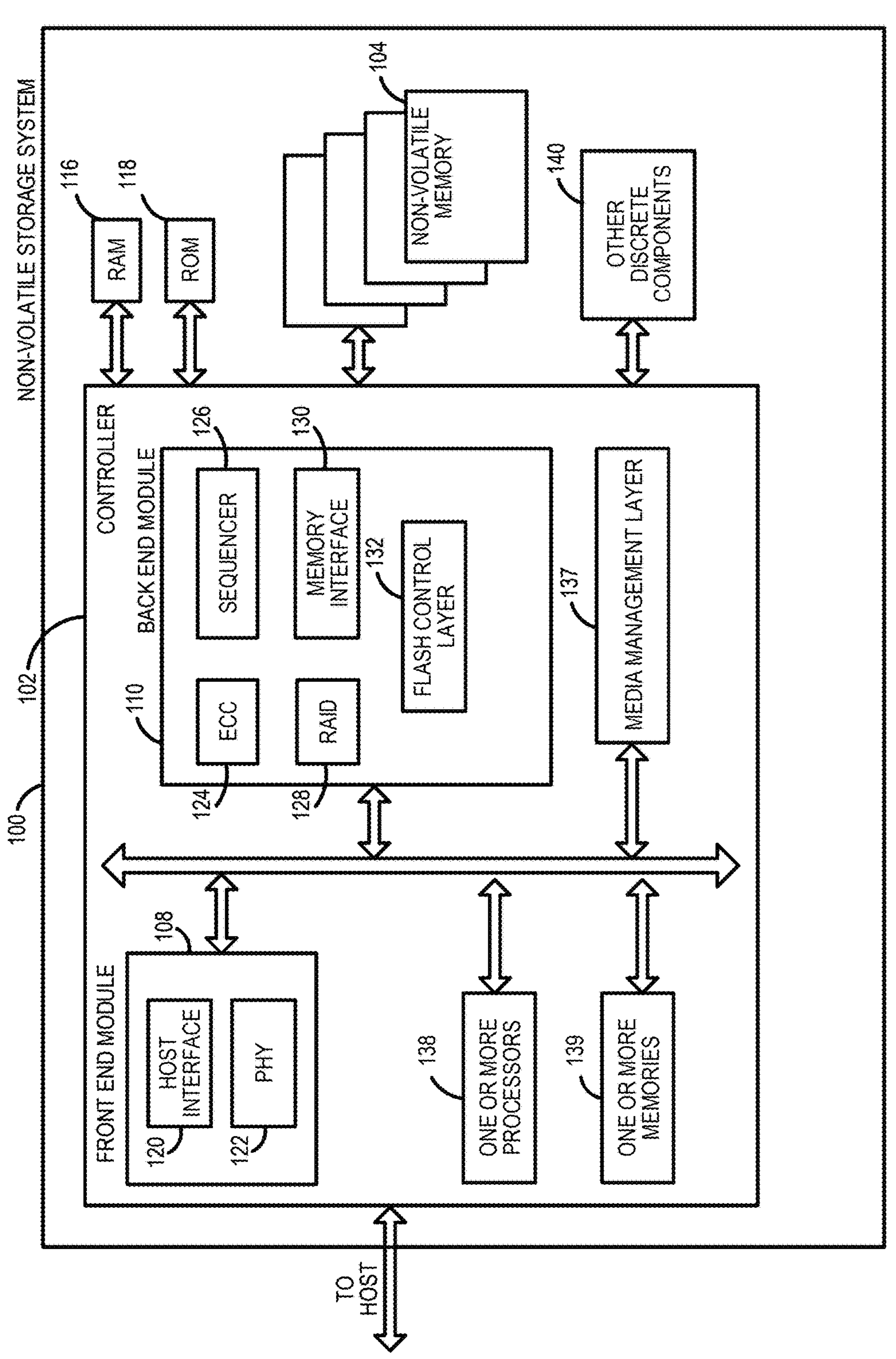
FIG. 2A is a block diagram illustrating components of the controller of the data storage device illustrated in FIG. 1A according to an embodiment.

The controller 102 (which may be a non-volatile memory controller (e.g., a flash, resistive random-access memory (ReRAM), phase-change memory (PCM), or magnetoresistive random-access memory (MRAM) controller)) can include one or more components, individually or in combination, configured to perform certain functions, including, but not limited to, the functions described herein and illustrated in the flow charts. For example, as shown in FIG. 2A, the controller 102 can comprise one or more processors 138 that are, individually or in combination, configured to perform functions, such as, but not limited to the functions described herein and illustrated in the flow charts, by executing computer-readable program code stored in one or more non-transitory memories 139 inside the controller 102 and/or outside the controller 102 (e.g., in random access memory (RAM) 116 or read-only memory (ROM) 118). As another example, the one or more components can include circuitry, such as, but not limited to, logic gates, switches, an application specific integrated circuit (ASIC), a programmable logic controller, and an embedded microcontroller.

In one example embodiment, the non-volatile memory controller 102 is a device that manages data stored on non-volatile memory and communicates with a host, such as a computer or electronic device, with any suitable operating system. The non-volatile memory controller 102 can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware (and/or other metadata used for housekeeping and tracking) to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card-based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, double-data-rate (DDR) interface, or serial attached small scale compute interface (SAS/SCSI). Storage module 200, in one embodiment, may be a solid-state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Referring again to FIG. 2A, the controller 102 in this example also includes a front-end module 108 that interfaces with a host, a back-end module 110 that interfaces with the one or more non-volatile memory die 104, and various other components or modules, such as, but not limited to, a buffer manager/bus controller module that manage buffers in RAM 116 and controls the internal bus arbitration of controller 102. A module can include one or more processors or components, as discussed above. The ROM 118 can store system boot code. Although illustrated in FIG. 2A as located separately from the controller 102, in other embodiments one or both of the RAM 116 and ROM 118 may be located within the controller 102. In yet other embodiments, portions of RAM 116 and ROM 118 may be located both within the controller 102 and outside the controller 102.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. The controller 102 in this example also comprises a media management layer 137 and a flash control layer 132, which controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller are optional components that are not necessary in the controller 102.

Figure 2B:
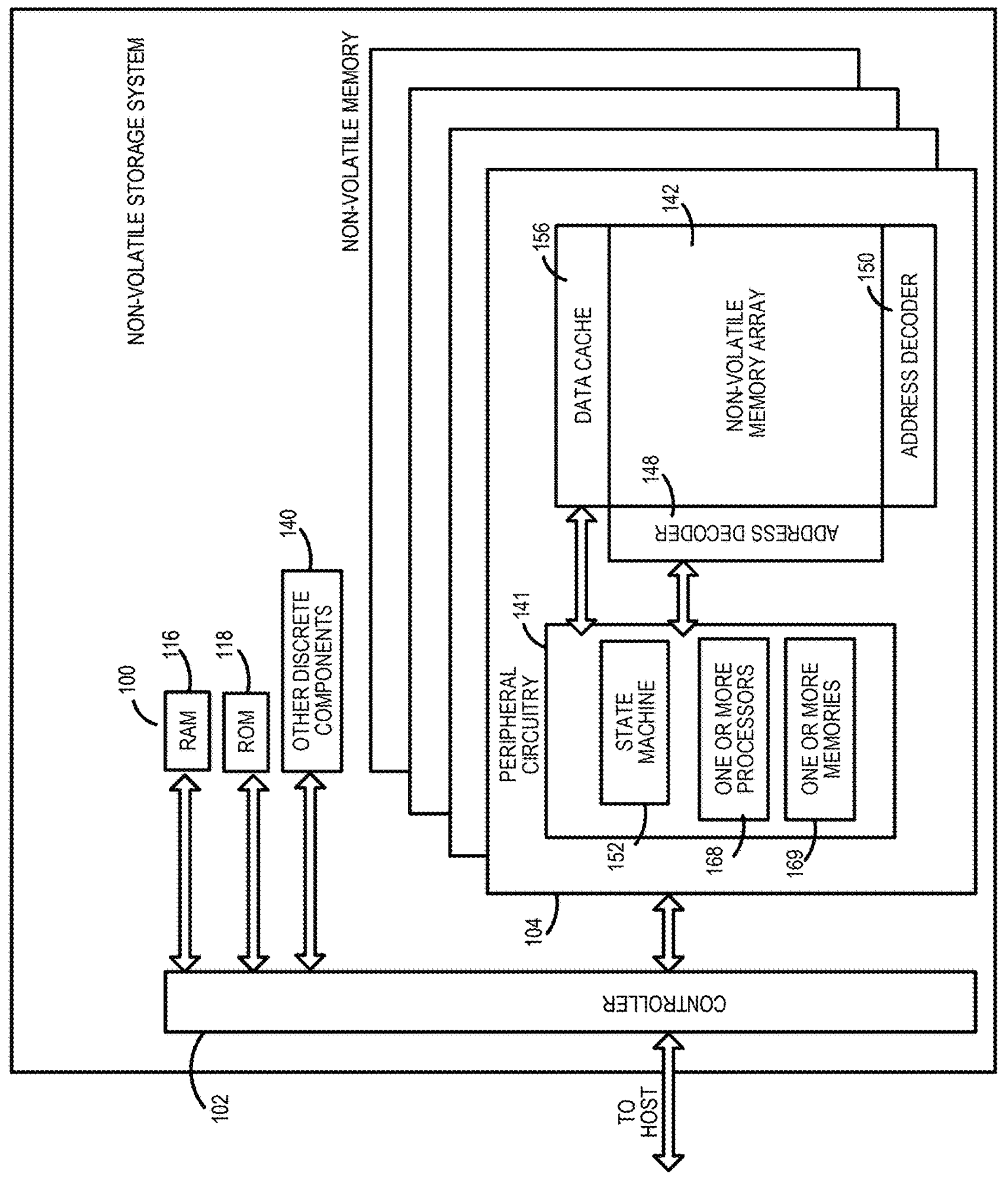
FIG. 2B is a block diagram illustrating components of the data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data and address decoders 148, 150. The peripheral circuitry 141 in this example includes a state machine 152 that provides status information to the controller 102. The peripheral circuitry 141 can also comprise one or more components that are, individually or in combination, configured to perform certain functions, including, but not limited to, the functions described herein and illustrated in the flow charts. For example, as shown in FIG. 2B, the memory die 104 can comprise one or more processors 168 that are, individually or in combination, configured to execute computer-readable program code stored in one or more non-transitory memories 169, stored in the memory array 142, or stored outside the memory die 104. As another example, the one or more components can include circuitry, such as, but not limited to, logic gates, switches, an application specific integrated circuit (ASIC), a programmable logic controller, and an embedded microcontroller.

In addition to or instead of the one or more processors 138 (or, more generally, components) in the controller 102 and the one or more processors 168 (or, more generally, components) in the memory die 104, the data storage device 100 can comprise another set of one or more processors (or, more generally, components). In general, wherever they are located and however many there are, one or more processors (or, more generally, components) in the data storage device 100 can be, individually or in combination, configured to perform various functions, including, but not limited to, the functions described herein and illustrated in the flow charts. For example, the one or more processors (or components) can be in the controller 102, memory device 104, and/or other location in the data storage device 100. Also, different functions can be performed using different processors (or components) or combinations of processors (or components). Further, means for performing a function can be implemented with a controller comprising one or more components (e.g., processors or the other components described above).

Returning again to FIG. 2A, the flash control layer 132 (which will be referred to herein as the flash translation layer (FTL) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
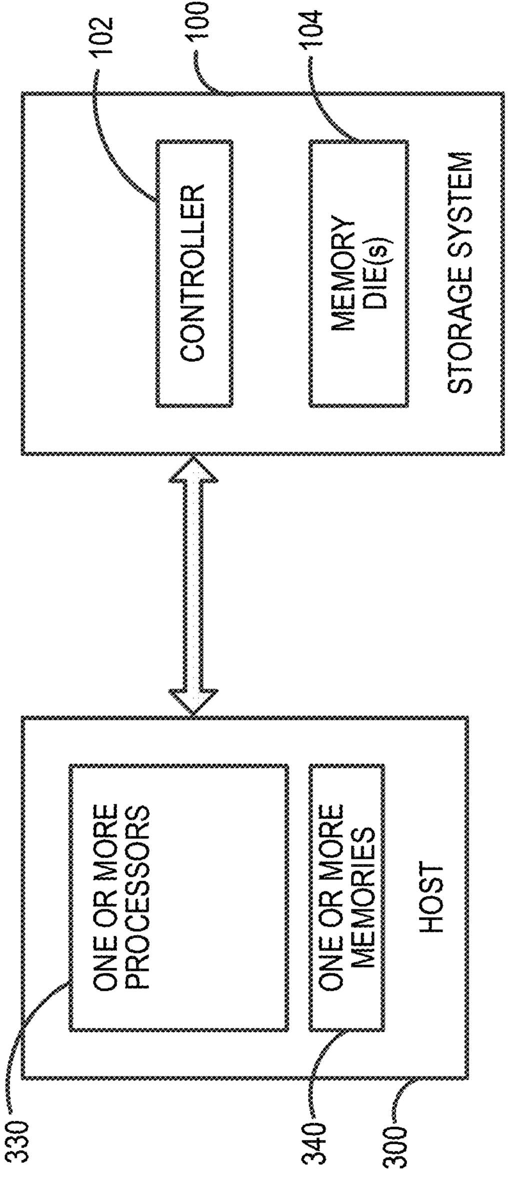
FIG. 3 is a block diagram of a host and a data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc.

The host 300 in this embodiment (here, a computing device) comprises one or more processors 330 and one or more memories 340. In one embodiment, computer-readable program code stored in the one or more memories 340 configures the one or more processors 330 to perform the acts described herein as being performed by the host 300. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

Figure 4:
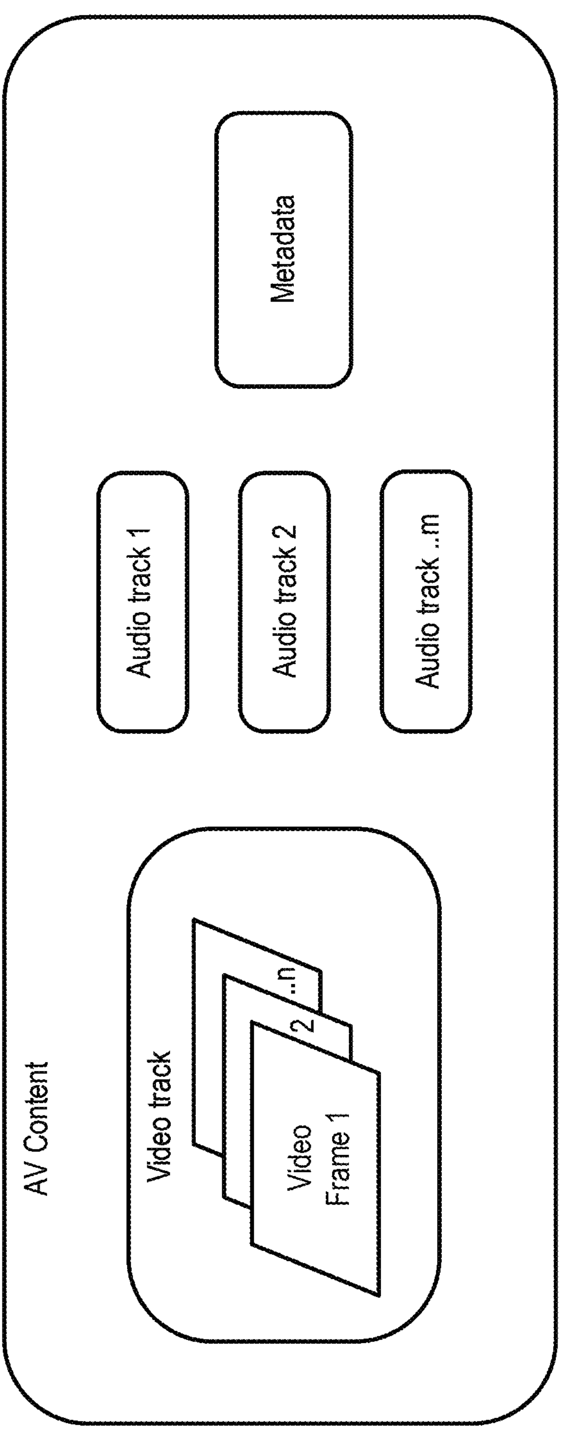
FIG. 4 is an illustration of audio-visual content of an embodiment.

Storage of audio/video ("AV") content is one of the primary usages of a data storage device. For example, NAND-based flash media is frequently used to store video content in cameras, televisions, and set-top boxes. As shown in FIG. 4, AV content typically comprises a video track comprising a plurality of video frames, one or more audio tracks, and associated metadata. The video track typically forms the largest part of the audio/video file. The size of each video frame can depend on factors, such as video resolution, pixel format, and compression. The overall structure of the media content and video frames can depend on the media format. Some formats, such as mpeg, H.264, and H.265, support compression. In some devices where high performance is a priority, video data can be stored in raw format, such as cinemaDNG and ariraw.

Storage of video data can require a relatively-large storage space for high-resolution video. Video can have rigid performance requirements. For example, video operations, such as encoding, decoding, writing, and reading, may need to be completed within a timeframe that is defined by the video frame rate. These space and performance requirements of video content can add to the challenge of providing a reliable data storage device for video.

Figure 5:
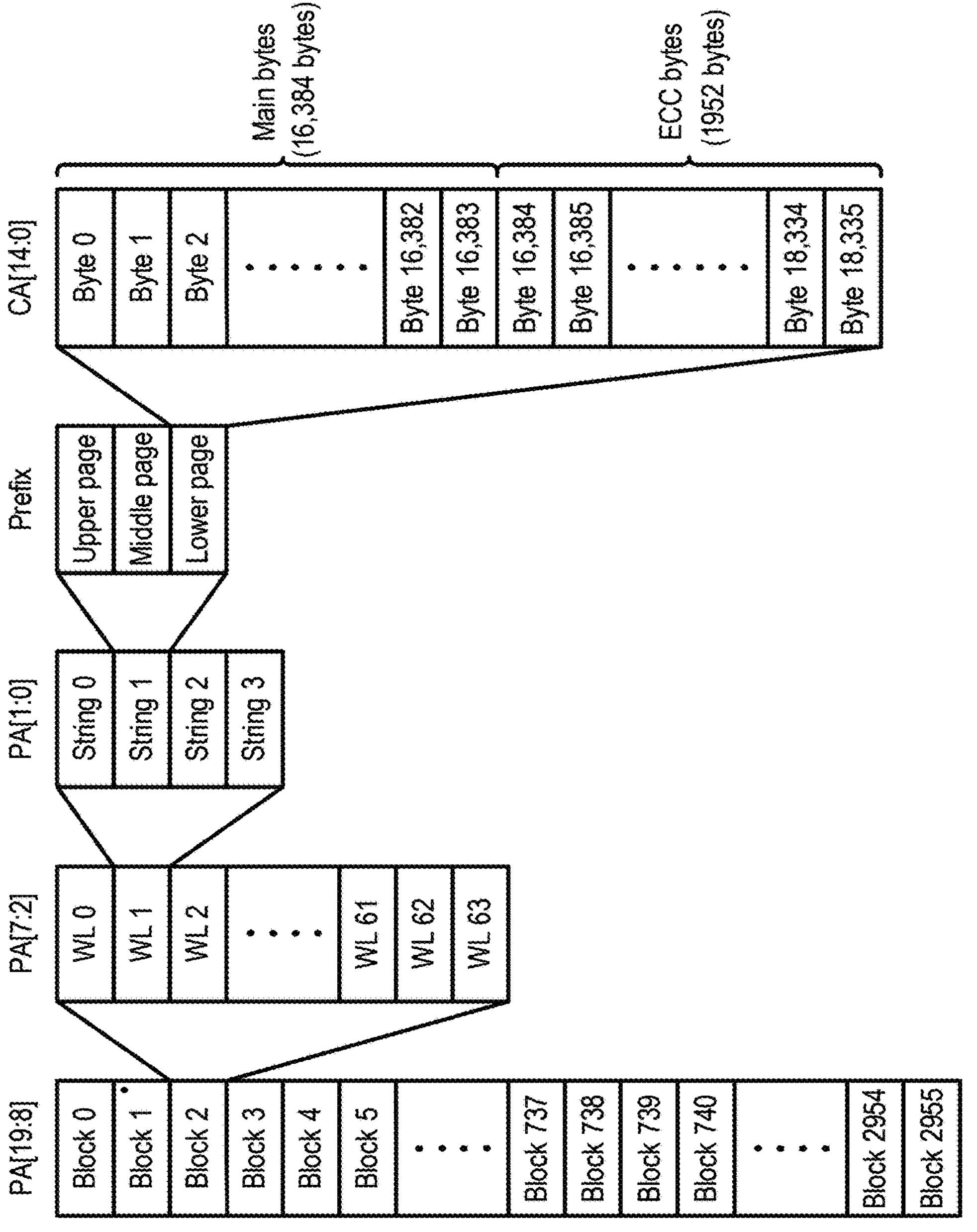
FIG. 5 is an illustration of a memory organization of an embodiment.

Another challenge relates to a wordline-to-wordline short ("WL2WLS"), which will be illustrated in conjunction with the memory architecture shown in FIG. 5. As shown in FIG. 5, in this architecture, the non-volatile memory is organized into a plurality of blocks. In a NAND storage device, a block is the minimum unit for an erase operation, and a page is the minimum unit for a write/read operation. Each block comprises a plurality of wordlines. In this example, each wordline comprises a plurality of strings, each of which comprises a plurality of pages, each of with comprises a plurality of bytes. It should be understood that this is just an example architecture and that other architectures can be used.

In a NAND system having this architecture, it is frequently seen that a damaged wordline can result in damage to an adjacent wordline. This is referred to as a wordline-to-wordline short ("WL2WLS"), which is a frequent cause of NAND failure. When video is stored in the memory, a wordline-to-wordline short can result in visible video artifacts in the video, or it may cause the data storage device to fail altogether.

To handle wordline-to-wordline shorts, the data storage device can use various writing and error correction mechanisms. For example, the data storage device can a dual write technique in which the data storage device writes the same host data to two blocks. That way, if there is an error writing the data in one block, the data can be recovered from the second block. As another example, an enhanced post-write read (EPWR) operation can be used to detect errors while writing an open block. If an error is detected, the write operation can be retried. As yet another example, an exclusive-or (XOR) operation can be used, in which multiple pages of data are XOR'ed together to generate XOR parity. If one of the pages gets corrupted, the XOR parity and other pages that have participated in parity generation can be used to recover the failed page.

While the various writing and error correction mechanisms can be useful in handling wordline-to-wordline shorts, the use of these mechanisms may impact the performance of the data storage device. The following embodiments can be used to address this problem. More specifically, in the following embodiments, consecutive (adjacent/adjoining) video frames are not stored in consecutive wordlines in the memory. That way, if a wordline-to-wordline short exists, the wordline-to-wordline short will not corrupt consecutive video frames. Because the video frames that are corrupt are not consecutive, each corrupted video frame can be seamlessly handled by a video decoder or driver without causing a visible video artifact (which can happen when the corrupted frames are consecutive frames) if the corrupted frame has good previous and subsequent video frames.

Figure 6:
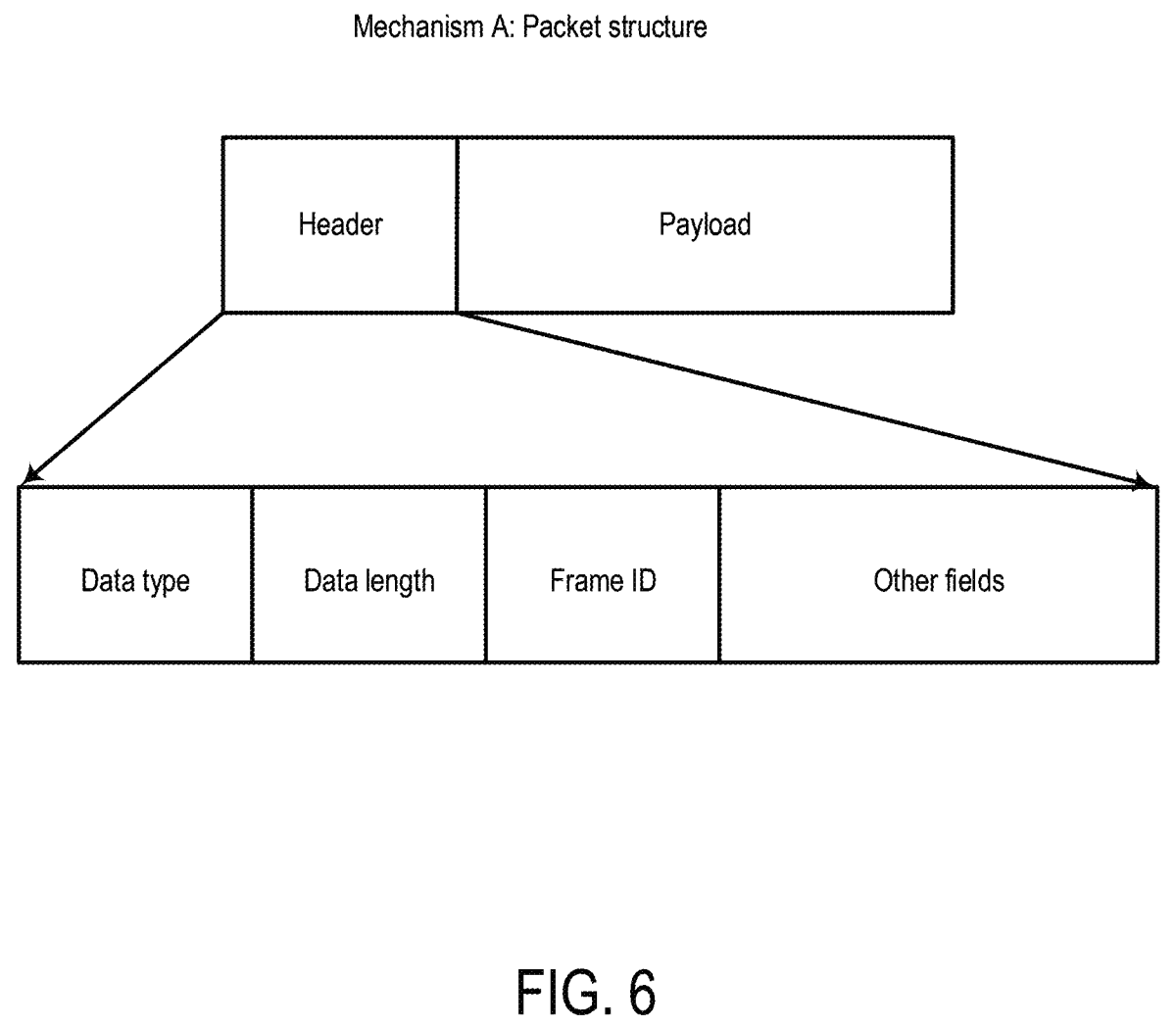

These embodiments can be performed in any suitable manner. In one example implementation, a host driver, video recorder, and/or storage driver in the host 300 (e.g., implemented by the one or more processors 330 in the host 300) is configured to segregate video frames, audio tracks, and metadata; identify the individual video frames; and number them incrementally, which can be used to identify which video frames are consecutive. The host 300 and the controller 102 of the data storage device 100 can agree on a communication mechanism via a handshake after power on or during runtime. Any suitable communication mechanism can be used. For example, as shown in FIG. 6, in one embodiment, the host 300 sends video frames to the data storage device 100 with a data header that can contain information, such as frame identifier (ID) (e.g., frame number), length, and data type. This header can be prepended to the video frame payload and sent to the data storage device 100. An advantage of this mechanism is that it does not depend on a specific communication protocol mechanism.

In another example mechanism, the individual video frames can be sent to the data storage device 100 as individual write commands. A protocol-specific mechanism can be used to communicate the frame IDs (e.g., frame numbers) to the data storage device 100. For example, a stream ID/tag in the USB protocol can be used to send the frame ID when the front end of the data storage device 100 is USB. Audio and metadata packets can be sent separately, and a protocol-specific mechanism can be used to identify those packets as non-video packets.

The controller 102 can be configured to be aware of the mechanism to identify individual video frame packets based on the communication mechanism and can implement the wordline restriction while writing the packets to the memory 104. For example, typically, a flash translation layer (FTL) component in the controller's firmware implements an open block mechanism where the controller 102 write data received from the host 300 in an open block in the memory 104. When that block is filled, the controller 102 marks that block as closed, and a new block is opened for writing additional data received from the host 300. In this embodiment, the controller 102 uses two or more open blocks to support the wordline restriction scheme. For example, when maintaining two open blocks, the controller 102 can keep track of the frame IDs of the write requests. As shown in FIG. 7, if Frame N is written to Block 1, the controller 102 can write Frame N+1 to Block 2. This way, when each block fills up and gets closed, it will be compliant with the wordline restriction scheme presented herein. The controller 102 can perform management operations (e.g., relocation and garbage collection) on these blocks without breaking the wordline restriction.

With these embodiments, error recovery mechanisms, such as XOR or dual write, can be reduced or removed, which will help in improving the performance of the data storage device. Also, a wordline-to-wordline short can be a grown defect. But because of the wordline storage restriction mechanism of this embodiment, when an error occurs in one video frame, adjoining frames will not be impacted. When the host 300 is reading from the memory 104 and the controller 102 of the data storage device 100 encounters error, the controller 102 can report the error to the host 300. In this scenario, the host driver can recover the video using adjoining frames.

There are several advantages associated with these embodiments. For example, these embodiments can help in saving the overhead of existing error correction mechanisms, increase performance for high-bandwidth video if existing error correction mechanisms are skipped, minimize the impact on user experience in case of a wordline-to-wordline short, increase endurance due to reduced write amplification, and increase storage capacity.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
a memory comprising a plurality of wordlines; and
one or more processors, individually or in combination, configured to:
receive, from a host, a plurality of video frames for storage in the memory;
negotiate a communication mechanism with the host for receiving information regarding an order of the plurality of video frames;
receive, from the host, information regarding the order of the plurality of video frames; and
store the plurality of video frames in the memory such that consecutive video frames are stored in non-consecutive wordlines as protection against a word-line-to-wordline short.

2. The data storage device of claim 1, wherein the one or more processors, individually or in combination, are further configured to store consecutive video frames in different open blocks.

3. The data storage device of claim 1, wherein the information regarding the order of the plurality of video frames comprises frame numbers.

4. The data storage device of claim 3, wherein the host is configured to segregate the plurality of video frames from a video file and number the plurality of video frames incrementally with the frame numbers.

5. The data storage device of claim 1, wherein the information regarding the order of the plurality of video frames is stored in headers of the plurality of video frames, wherein a header of given video frame of the plurality of video frames identifies that video frame's position in the order.

6. The data storage device of claim 1, wherein the information regarding the order of the plurality of video frames is received as individual write commands.

7. The data storage device of claim 1, wherein the plurality of video frames is stored the memory without using a dual write operation.

8. The data storage device of claim 1, wherein the plurality of video frames is stored the memory without using an enhanced post-write read (EPWR) operation.

9. The data storage device of claim 1, wherein the plurality of video frames is stored the memory without using an exclusive-or (XOR) operation to generate XOR parity.

10. The data storage device of claim 1, wherein the memory comprises a three-dimensional memory.

11. A method comprising:
performing in a data storage device in communication with a host, the data storage device comprising a memory comprising a plurality of wordlines:
receiving, from the host, a plurality of video frames for storage in the memory;
negotiating a communication mechanism with the host for receiving information for identifying which video frames of the plurality of video frames are adjacent;
receiving, from the host, the information for identifying which video frames of the plurality of video frames are adjacent; and
storing adjacent video frames of plurality of video frames in non-adjacent wordlines in the memory.

12. The method of claim 11, wherein the adjacent video frames of plurality of video frames are stored in different open blocks.

13. The method of claim 11, wherein the information for identifying which video frames of the plurality of video frames are adjacent comprises frame numbers.

14. The method of claim 11, wherein the communication mechanism is negotiated after power on.

15. The method of claim 11, wherein the communication mechanism is negotiated during runtime.

16. The method of claim 11, wherein the communication mechanism comprises a protocol-specific mechanism.

17. The method of claim 16, wherein the protocol-specific mechanism comprises a stream identifier.

18. A data storage device comprising:
a memory comprising a plurality of wordlines; and
means for:
receiving, from a host, a plurality of video frames for storage in the memory;
negotiating a communication mechanism with the host for receiving information for identifying which video frames of the plurality of video frames are adjacent;
receiving, from the host, the information for identifying which video frames of the plurality of video frames are adjacent; and
storing adjacent video frames of plurality of video frames in non-adjacent wordlines in the memory.

* * * * *